United States Patent [19]
Tabor

[11] Patent Number: 5,482,668
[45] Date of Patent: Jan. 9, 1996

[54] DELAMINATION RESISTANT SPA METHOD OF MANUFACTURE

[75] Inventor: Thomas A. Tabor, Rancho Cucamonga, Calif.

[73] Assignee: Spa Controls, Hesperia, Calif.

[21] Appl. No.: 903,987

[22] Filed: Jun. 24, 1992

Related U.S. Application Data

[63] Continuation-in-part of Ser. No. 739,470, Aug. 2, 1991, abandoned.

[51] Int. Cl.$^6$ ............................................. B29C 51/10
[52] U.S. Cl. ............................. 264/512; 264/554; 4/584
[58] Field of Search ............................................ 4/584, 590

[56] References Cited

U.S. PATENT DOCUMENTS

| | | | |
|---|---|---|---|
| 4,233,694 | 11/1980 | Janosko et al. | 4/590 X |
| 4,371,494 | 2/1983 | Miller | 264/554 X |
| 4,844,944 | 7/1989 | Graefe et al. | 4/538 X |

*Primary Examiner*—Robert M. Fetsuga
*Attorney, Agent, or Firm*—Walter A. Hackler

[57] ABSTRACT

A spa having structural integrity is manufactured from a formable sheet contoured by the steps of disposing the formable sheet over a male form adapted for vacuum-forming the formable sheet, heating the formable sheet to a temperature enabling forming thereof, forcing the male form into the formable sheet with some portions of the forced formable sheet having a greater thickness than other portions of the formable sheet, and vacuum-forming the forced heated formable sheet into intimate contact with the male form. Thereafter, a urethane coating is applied to a side of the spa not contacted by the mold. This results in a delamination resistant spa.

3 Claims, 2 Drawing Sheets

DELAMINATION RESISTANT SPA METHOD OF MANUFACTURE

This application is a continuation-in-part of U.S. patent application Ser. No. 07/739,470, filed Aug. 2, 1991, now abandoned.

The present invention generally relates to a method for fabricating a spa having shape and structural integrity and having delamination resistance. While the present invention is particularly suitable for the fabrication of spa shells, other large forms such as saunas, bathtubs, shower stalls and camper shells also may be fabricated in accordance with the method of the present invention.

Large contoured articles such as spas and the like, which may have overall dimensions of four to fifteen feet or more, with depths of two to three feet, have been either cast, molded or laminated from a suitable material. Typically, the prior art method of fabrication utilizes an acrylic skin which has been formed into a desired contoured spa shape to provide a smooth surface suitable for spa use. Unfortunately, because the acrylic or other formed material is generally thin, the resulting shell has no structural integrity, i.e., it does not inherently have sufficient strength to hold water along with users of the spa without a deformation thereof. Such deformation ultimately results in a rupture of the spa.

To provide structural integrity, prior art processes have used layers of polyester resin or the like coated onto underside portions of the acrylic skin. This process involves either painting or spraying a layer of resin, which may thereafter be covered with a coating of fiber glass, which in turn requires impregnation of the fiber glass by rolling it into the resin. After the curing of one layer, additional layers may be applied as necessary to provide the desired structural integrity.

This process is, of course, time-consuming with a typical 7'×7' spa requiring up to three or more hours to apply the laminate polyester resin and fiber glass and allowing time for curing each layer after application. Additionally, the space requirements for such an operation are considerable.

A further disadvantage associated with the use of polyester materials is the emission of volatile organic compounds (VOC). Polyester materials suitable for the prior art construction of spas typically release polystyrene gases which have been identified as toxic by environmental agencies and can pose a health hazard to workers exposed thereto over long periods of time.

A recent advancement in the manufacture of spas has been the development of moldable "extruded sheets". These sheets typically include "extruded" Plexiglas®, DR®/ABS or "extruded" Robel®/ABS, available from Atlas-Alchem. These "extruded materials," among others, such as Alter plus®, available from Aristech Co., are available in thicknesses of ⅜" and can be vacuum-formed into large contoured articles, such as spas.

Unfortunately, during the vacuum-forming process in which a large flat sheet of the "extruded material" is disposed over a female form and vacuum-formed thereinto, footwell portions and seating portions of the spa have a material thickness significantly thinner, for example, ⅛" or less, than the original sheet thickness, and as a result, the footwell and seat portions of the spa do not have sufficient structural integrity to support users of the spa.

In order to be suitable for its intended use, these prior art spas must have the footwell and seating portions reinforced with resin or the like (as hereinabove described) with the concomitant problems associated therewith.

Alternatively, urethane formulations may be utilized to for both improving the insulation capabilities of the article and improving structural integrity. In this instance, a urethane foam is blown or srayed onto the acrylic shell.

However, it has been found that the urethane foam has a tendency to delaminate from the contoured sheet when exposed to direct sunlight. This causes a "bubble" or separation between the sheet and supporting urethane foam which may ultimately cause cracking of the sheet due to continued flexing thereof during use of the spa. Particularly vulnerable to this type of failure are footwell portions of the spas subjected to the weight of spa users.

While this type of spa failure is not likely when the spa is filled with water, because of the shielding of the spa footwell from the spa, such failure may occur when the spa is drained for cleaning. More importantly, and most likely to occur, however, is the delamination which can occur during storage of spas in outdoor yards before sale and empty display spas exposed to the sun at dealers. Naturally, such delamination is not readily visible and hence a defective spa may be delivered from a sales center even though the spa had no "defects" when shipped from a factory.

The present invention provides a method for fabricating an article having a shape and structural integrity utilizing an "extruded" Plexiglas®, or similar material, with delamination resistance.

SUMMARY OF THE INVENTION

A delamination resistant spa having structural integrity according to the present invention includes a formable sheet having a shape contoured by the steps of disposing a formable sheet over a male form adapted for vacuum-forming the formable sheet, heating the formable sheet to a temperature enabling forming of the formable sheet, forcing the male form into the heated formable sheet with some portions of the forced formable sheet having a greater thickness than other portions of the formable sheet, and vacuum-forming the forced heated formable sheet with one side coming into intimate contact with the male form. Thereafter, an opposite side, i.e., the side not coming into contact with the male mold, is coated with a urethane foam.

In addition, some portions of the spa have substantially the same thickness as the unformed formable sheet and preferably these portions comprise footwell and seating portions of the spa. In fact, the footwell portion may have a thickness of at least twice the thickness of the sidewall portions of the spa, the latter extending between the footwell portions and the rim of the spa. In this configuration, the footwell portions have enhanced strength to support users of the spa standing in the footwell.

A method in accordance with the present invention for producing a delamination resistant spa includes the steps of disposing a formable sheet over a male form adapted for vacuum-forming the formable sheet, heating the formable sheet to a temperature enabling forming of the formable sheet, and thereafter forcing the male mold into the heated formable sheet to depress the heated formable sheet with portions of the formable sheet maintaining substantially the same thickness as the unformed formable sheet. The method is completed by vacuum-forming the depressed formable sheet into intimate contact with the male form and coating an opposite side, or surface, of the sheet, i.e., not the side or surface contacting the male form, with urethane.

Suitable apparatus in accordance with the present invention for the manufacture of spas and the like generally includes a male mold having an exterior surface with a contoured shape corresponding to an entire surface of a desired spa. The male mold includes protruding portions interconnected by concave and convex surfaces. In combination therewith, vacuum means is included for drawing a formable sheet into intimate contact with the exterior surface of the male mold after the male mold has been forced into the formable sheet.

More particularly, a vacuum means may include means defining a plurality of holes through the male mold in the concave surfaces and channel means disposed over the plurality of holes on an interior side of the male mold, for enabling air to be drawn through the plurality of holes from the exterior surface of the male mold to conform the sheet to the concave surfaces.

The plurality of holes may have a spacing of between about 1/8" and about 1/4" from one another, and each hole may have a diameter of about 1/32". For the manufacture of spas, the exterior surface of the male mold may span the distance from at least about 6' or more with a depth of about 30". In this manner, the resulting spa has a continuous surface and may be manufactured in a two-step process of forcing the male mold into a heated formable sheet and thereafter drawing the formable sheet into the concave surfaces of the male mold.

In addition, means defining a groove on the exterior surface of the male mold interconnecting a plurality of holes may be provided for enabling the formable sheet to be drawn thereinto to form a decorative line on the formable sheet. In this manner, any surface irregularity which may be caused on the surface of the formable sheet by its being drawn into intimate contact with the concave surfaces of the male mold and against the holes may be made a decorative accent of the finished product.

BRIEF DESCRIPTION OF THE DRAWINGS

The advantages and features of the present invention will appear in the following description, considered in conjunction with the accompanying drawings in which.

DETAILED DESCRIPTION OF THE DRAWINGS

Figure 1:
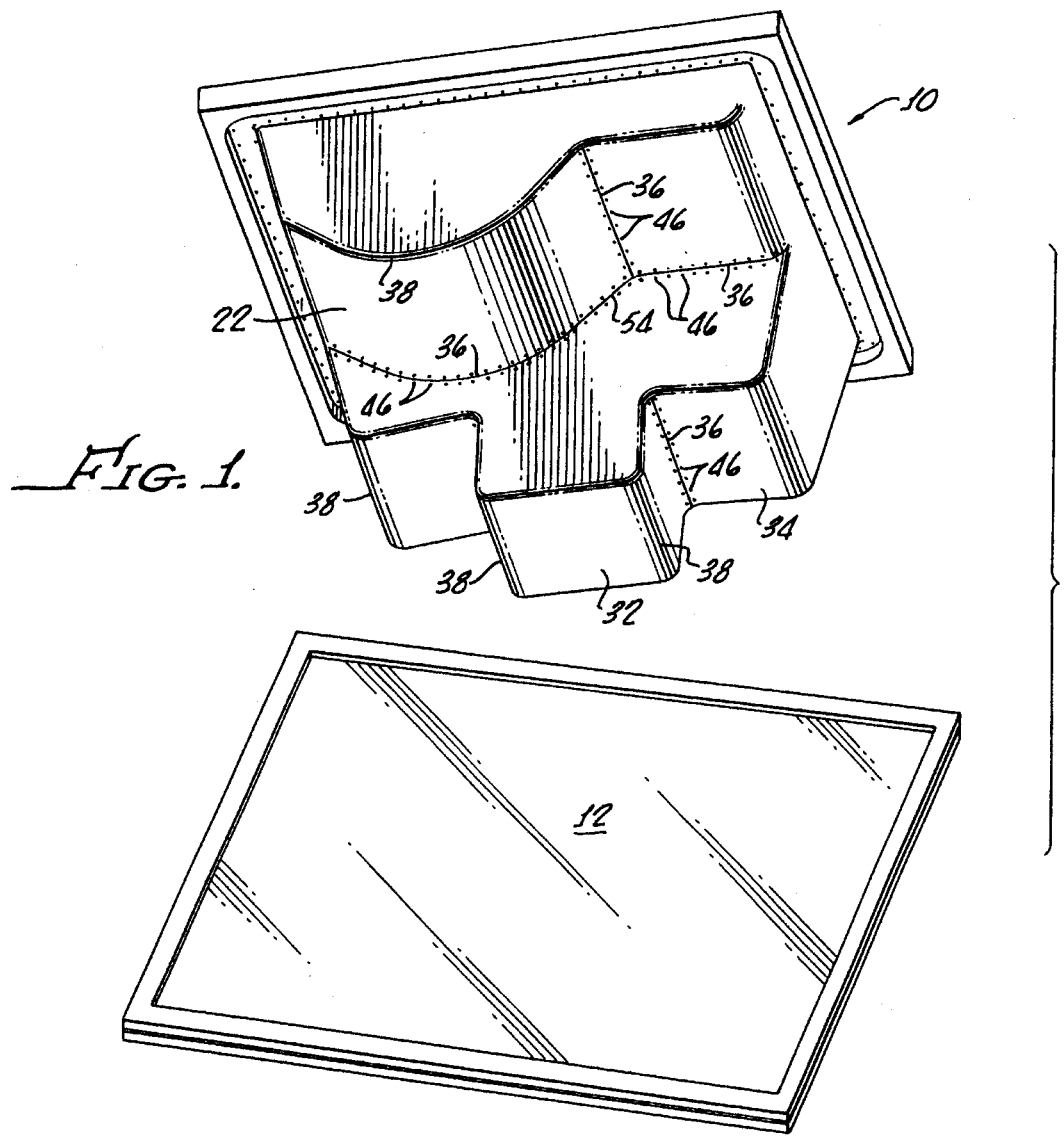
FIG. 1 is a perspective view of a male mold in accordance with the present invention, suitable for the manufacture of a spa or the like along with a generally flat sheet of formable material from which a spa is formed.

Turning now to the figures, there is shown a male mold 10 for forming a formable sheet 12 into a spa 20 as will be hereinafter described. The formable sheet 12 may be of any suitable material such as "extruded" Plexiglas®, DR®/ABS "extruded" Robel®/ABS, or Alter plus® as hereinbefore noted, having a thickness of about 3/8" or more.

As shown in the figures, the male mold 10 includes an exterior surface 22 with a contoured shape 24 corresponding to an entire surface of the desired spa. The male mold 10 includes protruding portions, such as footwell portions 32 and seating portions 34, which are interconnected by concave and convex surfaces 36, 38.

Figure 2:
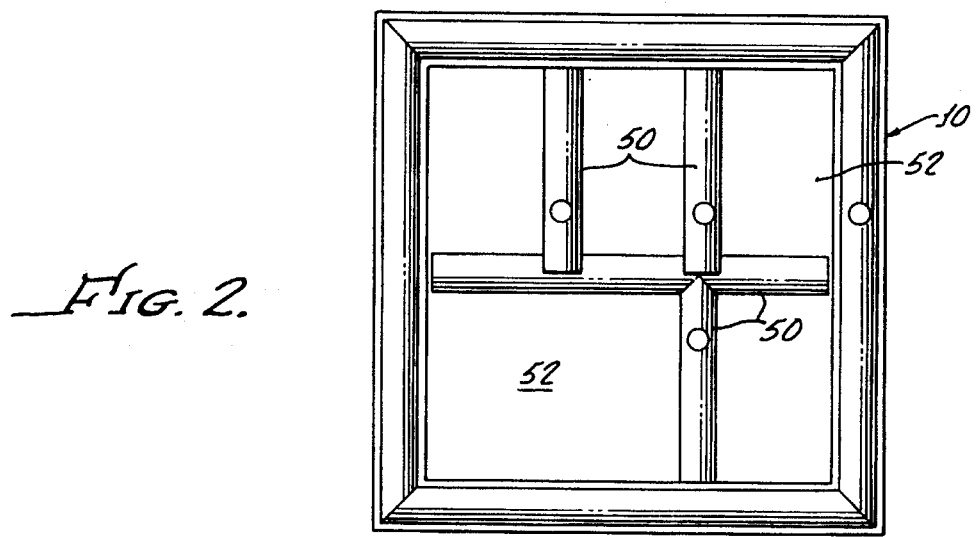
FIG. 2 is a view of an interior side of the male form showing channels enabling a vacuum to be drawn between the formable sheet and the male form concave surfaces after the form has been forced into the formable sheet.
Figure 3:
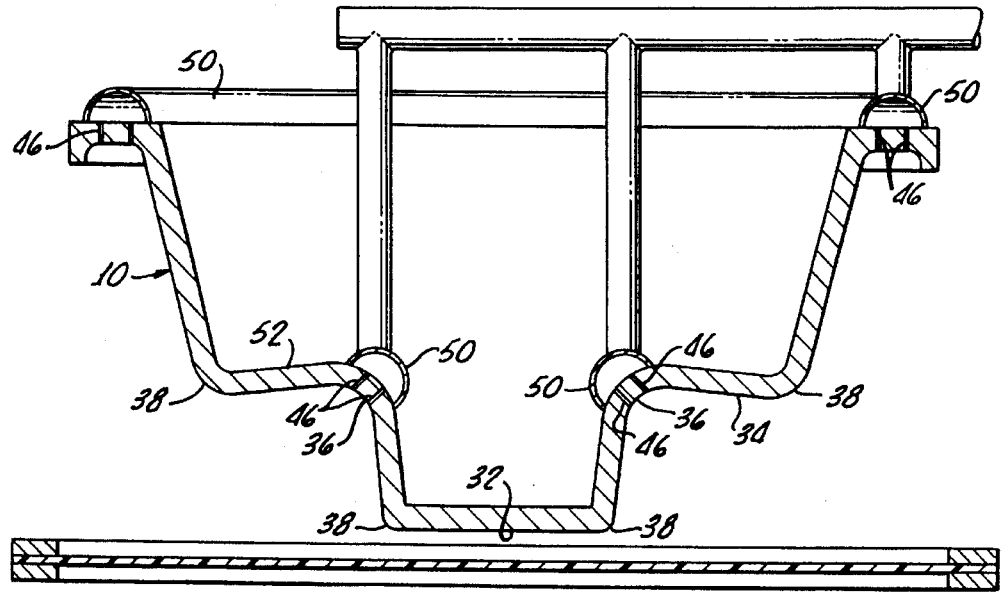
FIG. 3 is a cross-sectional view of the male form and formable sheet.
Figure 4:
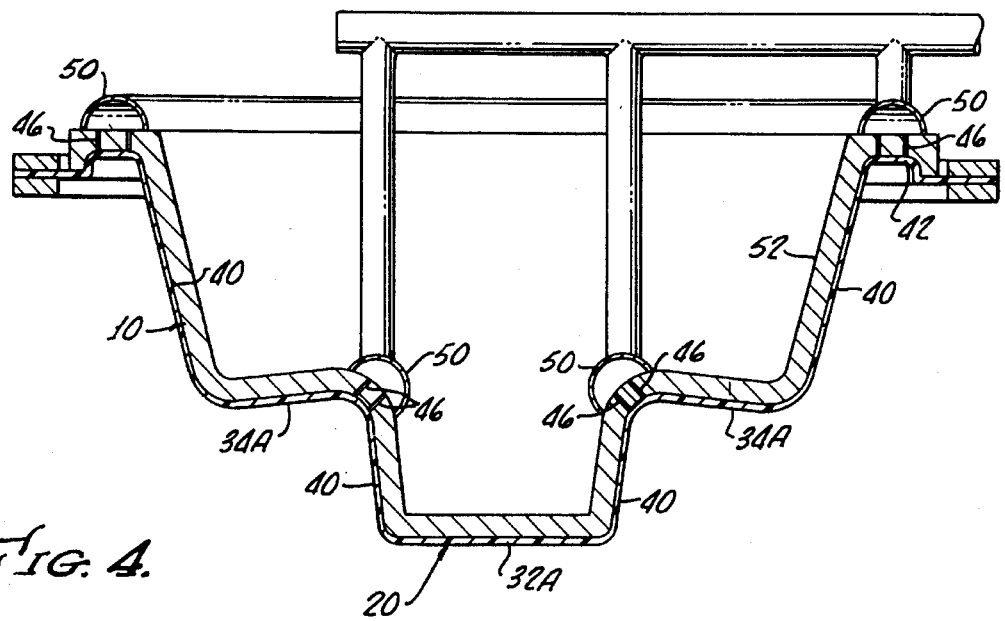
FIG. 4 is a cross-sectional view similar to that shown in FIG. 2 after forcing the male mold into the sheet and vacuum-forming the formable sheet into a conforming relationship with the male mold and thereafter applying a urethane coating.

These generally flat footwell and seating portions 36, 38 enable the forcing of the heated formable sheet 12, as shown in FIG. 2, without significant thinning of such footwell and seating portions 32, 34 from the original formable sheet 12 thickness. The resulting spa 20 has a nonuniform thickness as most clearly shown in FIG. 4 with the footwell and seating portions 32A and 34A of the spa 20 having a substantially greater thickness than sidewall portions 40 of the formed spa 20. Preferably, the footwell portions 32A of the spa 20 have a thickness of at least twice the thickness of the sidewall portions 40 and most preferably, substantially equal to the thickness of the unformed sheet 12 over rimmed portions 42 of the spa 20.

The male form 10 may be manufactured from any suitable material and include a plurality of holes 46 through the male mold 10 in the concave surfaces 36. A channel 50 disposed over the plurality of holes on the interior side 52 of the male mold 10 provide a means for enabling air to be drawn through the plurality of holes 46 from the exterior surface 22 of the male mold 10 when the channel 50 is interconnected to a vacuum pump or the like, not shown.

In combination, the channel 50 and the plurality of holes 46 provide vacuum means for drawing a formable sheet 12 into intimate contact with the interior surface 22 of the male mold 10 after the male mold 10 has been forced into the formable sheet 12.

In accordance with the method of the present invention, the formable sheet 12 is heated to a temperature enabling forming of the formable sheet prior to forcing the male mold 10 thereinto as shown in FIG. 2. It should be appreciated that the male form does not accomplish detailed forming of the spa but is utilized to control wall thickness of the spa 20.

After the male form 10 is forced into the formable sheet 12, the heated formable sheet is vacuum-formed to the exact contour of the male mold by exhausting air from the channel 50. The resulting spa 20 is shown in intimate contact with the male mold 10 in FIG. 4.

After cooling, the spa 20 may be coated, in a conventional manner, with a rigid urethane foam 48 which may have a thickness up to six inches or more to provide additional strength and for thermal insulation.

It has been found that when a spa is made in a conventional manner with a female mold, coating of the spa surface contacting the mold can give rise to delamination problems as hereinabove identified. However, when a male mold is used in accordance with the present invention, the urethane foam is applied to a side, or surface, 60 which is opposite to a side, or surface, 62, in intimate contact with the mold during vacuum forming. Under these conditions, delamination of the spa 20 and the urethane 48 does not occur after exposure to the sun. As hereinbefore noted, this results in a more durable spa for the end user and, very importantly, for the spa dealer who may utilize outside storage or display of spas.

Further accessories to the spa such as a frame for supporting the rim, plumbing, nozzle, and all additional accessory materials (not shown) may be added in a conventional manner.

As a specific example, when utilizing materials for the formable sheet hereinabove recited with a male mold having a depth of at least 30" and an exterior surface spanning a distance of at least about 6', the holes 46 may have a diameter of about 1/32" and be spaced between about 1/8" to about 1/4" from one another.

When utilizing the materials hereinabove recited with the 1/32" holes, it has been unexpectedly found that no surface irregularities are formed into the spa 20 after vacuum-drawing the formable sheet 12 into intimate contact with the exterior surface of the male form 10. Thus, no additional time or expense is necessary to finish the surface of the spa 20, which would otherwise be expected.

Large holes may result in a spa 20 surface having surface irregularities in areas drawn into intimate contact with the holes in the male mold. In this instance, a groove 54 may be provided interconnecting the plurality of holes, which enables the formable sheet 10 to be drawn thereinto in order to form a decorative line 56 on the formable sheet.

The exterior surface of the male mold is polished in any conventional manner before forcing into the formable sheet 12 in order to produce a smooth finish on the resulting spa which requires no further buffing or polishing.

Although there has been hereinabove described a method and apparatus for the manufacture of a spa having structural integrity in accordance with the present invention, for the purpose of illustrating the manner in which the invention may be used to advantage, it will be appreciated that the invention is not limited thereto. Accordingly, any and all modifications, variations, or equivalent arrangements which may occur to those skilled in the art, should be considered to be within the scope of the invention as defined in the appended claims.

What is claimed is:

1. A method for making a delamination resistant spa, said method comprising the steps of:
    (a) disposing a formable sheet over a male form adapted for vacuum-forming the formable sheet;
    (b) heating said formable sheet to a temperature enabling forming of said formable sheet;
    (c) forcing the male form into the heated formable sheet to depress said heated formable sheet;
    (d) vacuum-forming the depressed formable sheet with one side of the formable sheet coming into intimate contact with the male form;
    (e) cooling the vacuum-formed sheet; and
    (f) coating an opposite side of the cooled vacuum formed sheet with a urethane foam.

2. The method according to claim 1 wherein said formable sheet is depressed with portions thereof maintaining a thickness significantly greater than other portions thereof before cooling and coating of the sheet.

3. The method according to claim 2 wherein the step of coating an opposite side comprises applying at least about six inches of urethane foam to said opposite side.

* * * * *